US009528563B2

(12) United States Patent
Balz et al.

(10) Patent No.: US 9,528,563 B2
(45) Date of Patent: Dec. 27, 2016

(54) HYDRAULIC VEHICLE BRAKE WITH INTEGRATED ELECTROMECHANICALLY OPERABLE PARKING BRAKE

(75) Inventors: Jurgen Balz, Hunstetten-oberlibbach (DE); Hans Olms, Rossdorf (DE); Georg Halasy-Wimmer, Vaihingen (DE); Volker Knop, Ilmen (DE); Jurgen Volkel, Frankfurt am Main (DE); Thomas Winkler, Mainz (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1955 days.

(21) Appl. No.: 12/092,122

(22) PCT Filed: Nov. 1, 2006

(86) PCT No.: PCT/EP2006/068009
§ 371 (c)(1),
(2), (4) Date: Apr. 30, 2008

(87) PCT Pub. No.: WO2007/051809
PCT Pub. Date: May 10, 2007

(65) Prior Publication Data
US 2008/0283345 A1    Nov. 20, 2008

(30) Foreign Application Priority Data

Nov. 4, 2005  (DE) .................. 10 2005 053 055
Aug. 11, 2006  (DE) .................. 10 2006 037 660

(51) Int. Cl.
*F16D 55/26*    (2006.01)
*F16D 65/18*    (2006.01)
(Continued)

(52) U.S. Cl.
CPC ........... *F16D 65/18* (2013.01); *F16D 2121/02* (2013.01); *F16D 2121/24* (2013.01);
(Continued)

(58) Field of Classification Search
CPC .. F16D 65/56; F16D 2125/50; F16D 2125/48; F16D 2125/36; F16D 2121/24
(Continued)

(56) References Cited

U.S. PATENT DOCUMENTS 2,873,005 A * 2/1959 Butler .................. 188/73.41
3,029,660 A * 4/1962 Sears .................. F16H 25/2015
192/141
(Continued)

FOREIGN PATENT DOCUMENTS

DE    19521634    12/1996
EP    0866236    9/1998
(Continued)

*Primary Examiner* — Robert A Siconolfi
*Assistant Examiner* — James Hsiao
(74) *Attorney, Agent, or Firm* — RatnerPrestia (57) ABSTRACT

A hydraulic vehicle brake with a parking brake device, in particular for motor vehicles, includes a brake housing in which a hydraulic service pressure chamber is delimited by a brake piston, wherein hydraulic pressure fluid can be applied to the hydraulic service pressure chamber for carrying out service brake operations so that the brake piston is actuatable along a longitudinal piston axis in order to achieve a braking effect. The parking brake device acts on the brake piston with an actuating device, which actuates a rolling-element ramp-type gear with an electromechanical actuator.

In order to achieve a higher rate of overall efficiency as well as a reduced electric energy consumption, a two-step gear is interposed between the electromechanical actuator (7) and the actuating device (4), wherein the first gear step (11, 21, 31) on the inlet side is connected to an output shaft (8) of the electromechanical actuator (7) and the second gear step (12, 22, 32) on the outlet side is connected to the rolling-element ramp-type gear (1, 2, 3).

12 Claims, 7 Drawing Sheets

(51) Int. Cl.
*F16D 121/02* (2012.01)
*F16D 121/24* (2012.01)
*F16D 123/00* (2012.01)
*F16D 125/36* (2012.01)
*F16D 125/52* (2012.01)

(52) U.S. Cl.
CPC ...... *F16D 2123/00* (2013.01); *F16D 2125/36* (2013.01); *F16D 2125/52* (2013.01)

(58) Field of Classification Search
USPC .... 188/105, 106, 72.9, 73.41; 74/425, 22 A, 74/25, 416
See application file for complete search history.

(56) References Cited

U.S. PATENT DOCUMENTS

| | | | |
|---|---|---|---|
| 3,186,517 A * | 6/1965 | Harrison | 188/73.41 |
| 3,209,090 A * | 9/1965 | Fry | F16K 31/046 192/141 |
| 3,273,675 A * | 9/1966 | Brown | 188/73.41 |
| 3,613,356 A | 10/1971 | Woodward | |
| 3,809,191 A * | 5/1974 | Woodward | B60T 13/741 188/106 A |
| 3,927,736 A * | 12/1975 | Bergles | 188/26 |
| 3,955,480 A * | 5/1976 | Wosegien | 92/130 R |
| 4,030,774 A * | 6/1977 | Foster | 280/261 |
| 4,102,440 A * | 7/1978 | Wood | 188/72.7 |
| 4,391,351 A * | 7/1983 | Jirousek et al. | 188/18 A |
| 4,592,451 A * | 6/1986 | Persson | 188/71.9 |
| 4,712,441 A * | 12/1987 | Abraham | F16H 25/2015 74/412 TA |
| 4,760,895 A * | 8/1988 | Wickham | 185/40 R |
| 4,784,244 A * | 11/1988 | Carre | B60T 13/741 188/156 |
| 4,809,824 A * | 3/1989 | Fargier | B60T 8/32 188/106 P |
| 4,944,372 A * | 7/1990 | Taig | B60T 13/741 188/156 |
| 5,020,386 A * | 6/1991 | Taig | 74/384 |
| 5,107,967 A * | 4/1992 | Fujita | B60T 1/065 188/156 |
| 5,219,048 A * | 6/1993 | Shaw | B60T 13/741 188/106 P |
| 5,302,008 A * | 4/1994 | Miyake | B60T 8/4072 188/106 P |
| 5,487,452 A * | 1/1996 | Moinard | F16D 55/14 188/72.6 |
| 5,788,340 A * | 8/1998 | Kobayashi | 303/113.1 |
| 5,832,780 A * | 11/1998 | Gallienne | 74/425 |
| 5,971,110 A * | 10/1999 | Martin | F16D 65/18 188/158 |
| 6,012,556 A * | 1/2000 | Blosch et al. | 188/71.8 |
| 6,305,508 B1 * | 10/2001 | Schumann | 188/72.8 |
| 6,349,801 B1 * | 2/2002 | Koth et al. | 188/72.8 |
| 6,390,630 B1 * | 5/2002 | Ochs | 359/841 |
| 6,394,235 B1 | 5/2002 | Poertzgen et al. | |
| 6,412,608 B1 * | 7/2002 | Mohr et al. | 188/72.9 |
| 6,431,330 B1 * | 8/2002 | Poertzgen et al. | 188/156 |
| 6,457,783 B1 * | 10/2002 | Schanzenbach et al. | 303/115.2 |
| 6,471,017 B1 * | 10/2002 | Booz | F16D 55/02 188/162 |
| 6,543,902 B2 * | 4/2003 | Bohm | 359/841 |
| 6,655,507 B2 * | 12/2003 | Miyakawa et al. | 188/171 |
| 6,761,252 B2 * | 7/2004 | Weiler et al. | 188/72.7 |
| 6,806,602 B2 * | 10/2004 | Hilzinger et al. | 310/77 |
| 6,814,190 B1 * | 11/2004 | Van Winden et al. | 188/72.8 |
| 6,837,342 B1 * | 1/2005 | Olschewski et al. | 188/72.8 |
| 6,907,967 B1 * | 6/2005 | Kapaan et al. | 188/162 |
| 6,938,736 B2 * | 9/2005 | Takahashi | 188/72.1 |
| 6,948,595 B2 * | 9/2005 | Audren et al. | 188/72.8 |
| 6,966,410 B1 * | 11/2005 | Tacker | 188/2 D |
| 7,325,658 B2 * | 2/2008 | Halasy-Wimmer et al. | 188/158 |
| 7,374,026 B2 * | 5/2008 | Taylor et al. | 188/71.9 |
| 7,419,035 B2 * | 9/2008 | Fuderer et al. | 188/71.9 |
| 7,455,152 B2 * | 11/2008 | Wang | 188/72.4 |
| 7,516,822 B2 * | 4/2009 | Kramer | B60T 7/107 188/156 |
| 7,635,050 B2 * | 12/2009 | Yamamoto | 188/73.1 |
| 8,006,814 B2 * | 8/2011 | Baier-Welt et al. | 188/72.7 |
| 8,047,339 B2 * | 11/2011 | Park | 188/72.8 |
| 8,292,042 B2 * | 10/2012 | Kim | F16D 65/18 188/162 |
| 8,616,348 B2 * | 12/2013 | Winkler et al. | 188/72.8 |
| 8,776,958 B2 * | 7/2014 | Shiraki | B60T 13/741 188/158 |
| 2003/0042084 A1 * | 3/2003 | Kawase et al. | 188/72.1 |
| 2004/0089505 A1 * | 5/2004 | Audren et al. | 188/71.5 |
| 2004/0104087 A1 * | 6/2004 | Takahashi | 188/156 |
| 2004/0124042 A1 * | 7/2004 | Kriz, II | F16D 65/18 188/162 |
| 2004/0195058 A1 | 10/2004 | Ina et al. | |
| 2005/0000757 A1 * | 1/2005 | Wang | 188/71.1 |
| 2005/0039990 A1 * | 2/2005 | Girod et al. | 188/72.1 |
| 2005/0217949 A1 | 10/2005 | Ohta | |
| 2005/0252731 A1 * | 11/2005 | Hedman | 188/71.5 |
| 2005/0252735 A1 * | 11/2005 | Taylor et al. | 188/72.9 |
| 2006/0124402 A1 * | 6/2006 | Bieker et al. | 188/71.1 |
| 2006/0131113 A1 * | 6/2006 | Christof et al. | 188/72.1 |
| 2007/0158148 A1 * | 7/2007 | Ohtani | F16D 65/18 188/158 |
| 2010/0163351 A1 * | 7/2010 | Sakashita et al. | 188/182 |

FOREIGN PATENT DOCUMENTS

| | | | |
|---|---|---|---|
| JP | 2006177532 A * | 7/2006 | |
| WO | 2004099645 | 5/2004 | |

* cited by examiner

HYDRAULIC VEHICLE BRAKE WITH INTEGRATED ELECTROMECHANICALLY OPERABLE PARKING BRAKE

This application is the U.S. national phase of international application PCT/EP06/68009 filed Nov.1, 2006, which designated the U.S. and which claims the benefit of priority of German Patent Application Number 10 2006 037 660.9 filed Aug. 11, 2006 and German Patent Application Number 10 2005 053 055.9 filed Nov. 4, 2005 .The contents of each of the aforementioned documents are incorporated herein in their entirety.

BACKGROUND OF THE INVENTION

The present invention relates to a hydraulic vehicle brake with a parking brake device, in particular for motor vehicles, including a brake housing in which a hydraulic service pressure chamber is delimited by a brake piston, wherein hydraulic pressure fluid can be applied to the hydraulic service pressure chamber for carrying out service brake operations so that the brake piston is actuatable along a longitudinal piston axis in order to achieve a braking effect, and wherein the parking brake device acts on the brake piston by means of an actuating device, which actuates the brake piston to perform parking brake operations by means of a rolling-element ramp-type gear that is driven by an electromechanical actuator, and holds it in the actuated position.

This kind of hydraulic vehicle brake is e.g. known from WO 2004/099645 A1. A swiveling lever is connected to a ramp arrangement in the prior art vehicle brake. The swiveling lever must be swiveled for actuation of the parking brake. For this purpose a first embodiment arranges for an eccentric device which is actuated by a motor drive, wherein the swiveling lever upon activation of the motor drive is sliding on the eccentric plate and swivels in doing so. According to a second embodiment, the lever is swiveled by a motive linear driver. The prior art vehicle brake requires for the actuation a comparatively great electric power consumption, however, which is considered as disadvantageous in a motor vehicle with a limited electric capacity.

Furthermore, EP 1 584 835 A1 discloses a disc brake with a parking brake mechanism, which includes a rolling-element ramp-type gear. This rolling-element ramp-type gear can be operated by way of a lever and a bevel gear drive, wherein the first bevel wheel is connected to the lever and the second bevel wheel is connected to the driving ramp. However, an electromechanical actuation of the rolling-element ramp-type gear is not intended.

In view of the above, the object of the invention is to improve a hydraulic vehicle brake of the type referred to hereinabove to such effect the electric power consumption for performing parking brake operations is reduced.

SUMMARY OF THE INVENTION

According to the invention, this object is achieved by a device including a two-step gear interposed between the electromechanical actuator and the actuating device. The first gear step on the inlet side is connected to an output shaft of the electromechanical actuator and the second gear step on the outlet side is connected to the rolling-element ramp-type gear. This provision enhances the overall efficiency with the result of reduced electric power consumption.

Thus, it is provided in an especially advantageous improvement of the subject matter of the invention that the two-step gear is configured as a two-step worm gear, and the first and/or the second gear step is of self-locking design.

In an alternative embodiment, the two-step gear is a combination of a crown gear and a worm gear, with the worm gear forming the second gear step and being of self-locking design. In another alternative, the two-step gear is designed as a combination of a gear reducer unit and an eccentric gear, wherein the eccentric gear forms the second gear step and is of self-locking design.

It is arranged in an especially preferred embodiment of the subject matter of the invention that the electromechanical actuator is arranged in such a fashion that its output shaft is disposed in parallel to the longitudinal piston axis.

In a favorable improvement of the subject matter of the invention, the electromechanical actuator is decoupled from the brake housing and a housing, which accommodates the two-step gear and the electromechanical actuator, by means of dampening elements. This measure prevents the transmission of developing noise and the vibrations of the electromechanical actuator to the adjoining components, and the annoyance of the surroundings caused by noise is reduced to a minimum.

A sensor element is provided to sense the angular position of the output shaft of the electromechanical actuator or to sense the angular position of a gear element. In addition, a means to sense the current consumption of the electromechanical actuator is provided. The travel of the brake piston can be detected this way, serving as a regulating variable for the control of the clamping force in addition to the measured value of the current consumption of the electromechanical actuator.

In a particularly favorable improvement of the subject matter of the invention, at least one spring element is arranged in the flux of forces or in the flux of moments in order to maintain the adjusted clamping force and to compensate thermal shrinking effects. The spring element arranged in the flux of forces is then designed as a cup spring assembly. It acts on the brake piston and can be loaded hydraulically and/or electromechanically. The spring element arranged in the flux of moments is configured as a torsion spring, it acts on a gear element and can be loaded electromechanically.

The vehicle brake has a modular design, and the electromechanical actuator along with the two-step gear constitutes a subassembly that can be handled independently.

A mechanical unlocking means for unlocking the parking brake is provided in a favorable improvement of the subject matter of the invention. This measure allows emergency unlocking of the parking brake upon failure or a defect of the electric energy supply.

In another favorable improvement of the subject matter of the invention, the rolling-element ramp-type gear is formed of a driving ramp and an output end ramp, wherein rolling elements are provided between the ramp halves by way of which the driving ramp is in contact with the output end ramp.

The invention will be described in detail hereinbelow by way of an embodiment making reference to the accompanying drawings.

DETAILED DESCRIPTION OF THE DRAWINGS

Figure 1:
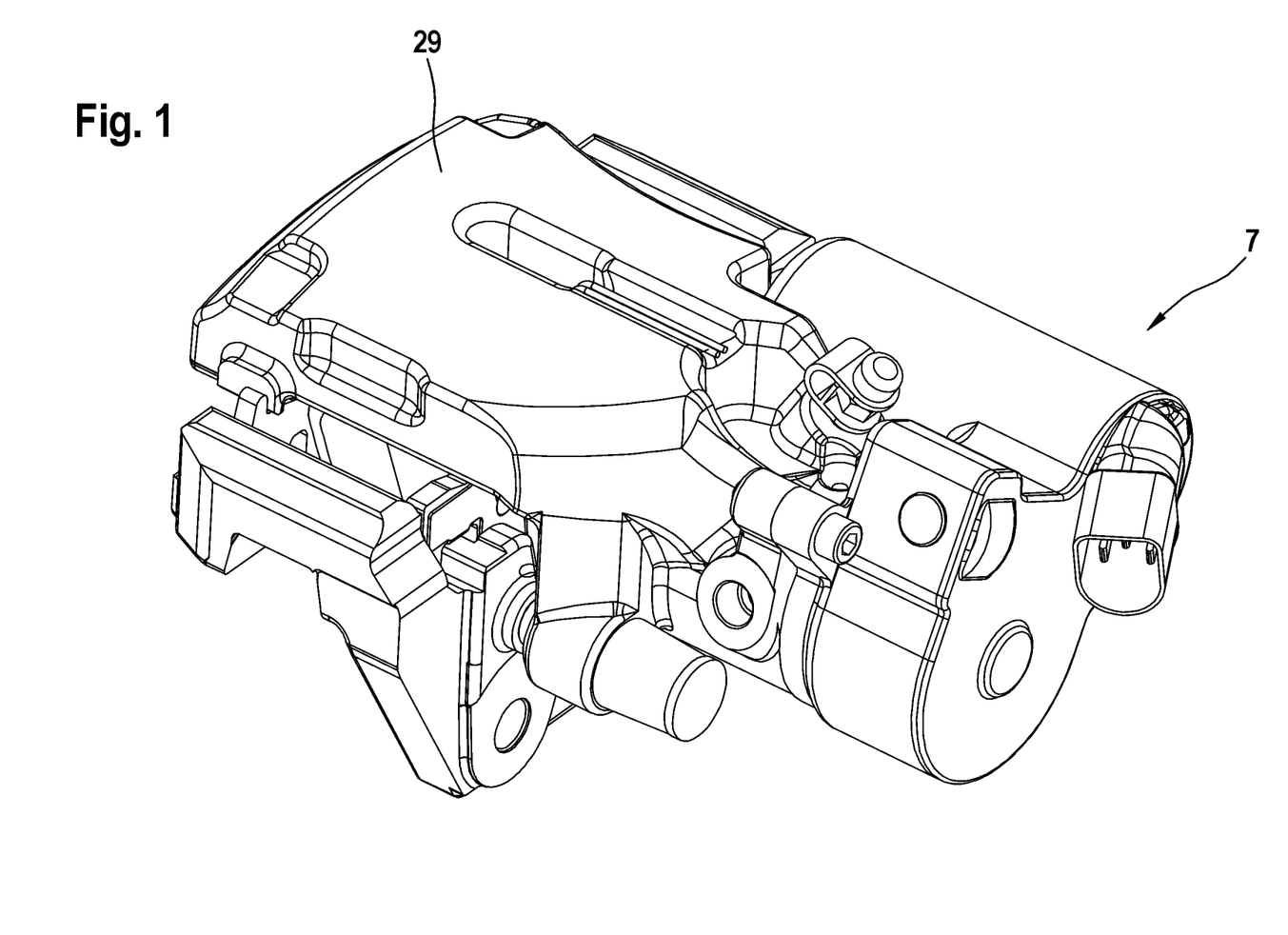
FIG. 1 is a three-dimensional view of an embodiment of the vehicle brake of the invention.

FIG. 1 shows a three-dimensional view of the vehicle brake of the invention. The vehicle brake of the invention, on the one hand, includes a hydraulically operable service brake and an electromagnetically operable parking brake, on the other hand. As can be seen in FIG. 1, an electromechanical actuator 7, a two-step gear and the necessary sensors are integrated. The basic idea of the invention at topic involves equipping the parking brake actuation of a prior art combined caliper with ball and ramp actuation with an electromechanical drive rather than with a conventional cable operation.

Figure 2:
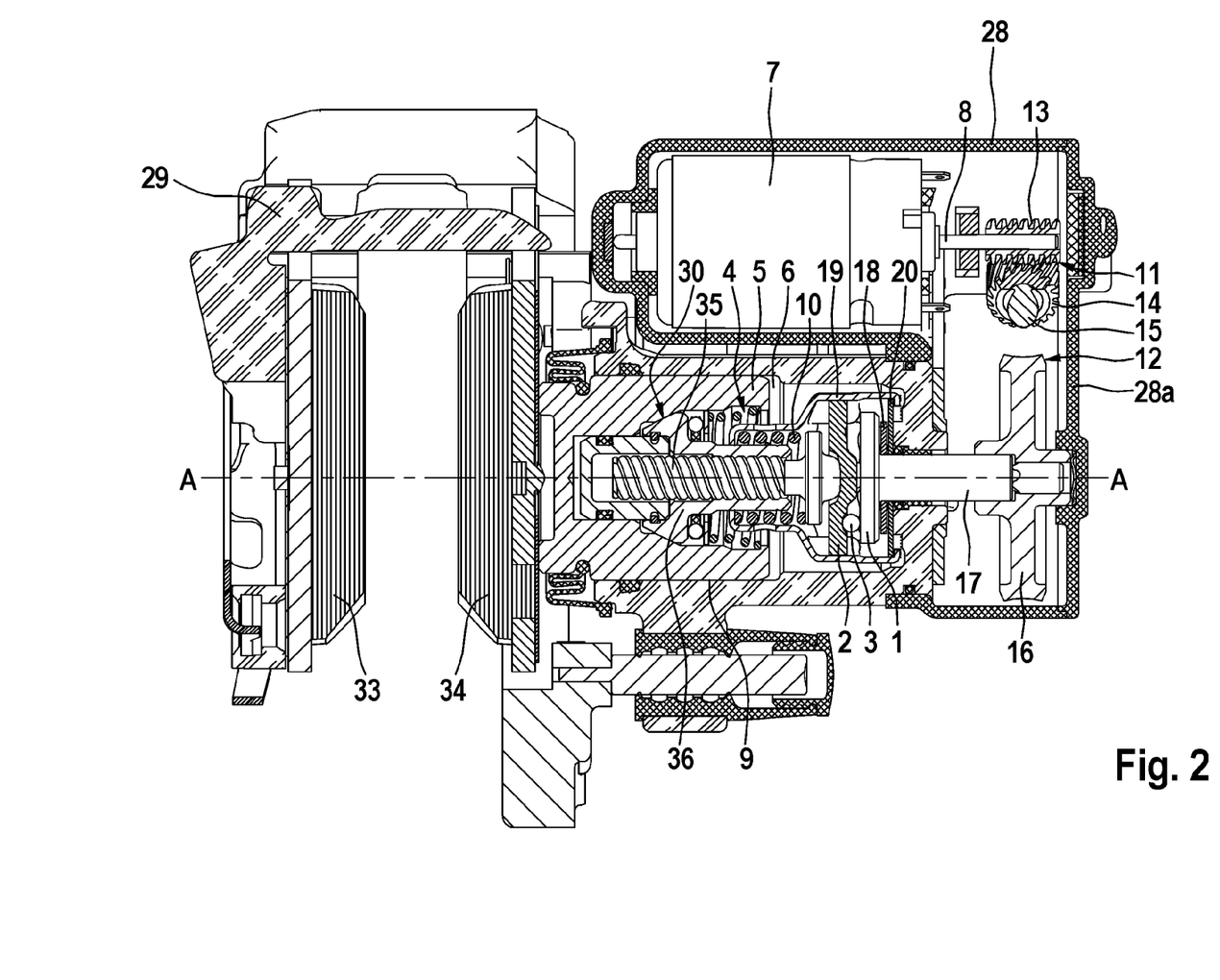
FIG. 2 is a cross-sectional view of the vehicle brake of FIG. 1.

The hydraulic vehicle brake of the invention as illustrated in FIG. 2 includes a brake housing 29 which embraces the outside edge of a brake disc (not shown) and two brake pads 33, 34 arranged on either side of the brake disc. The brake housing 29 on its inside surface forms a brake cylinder 9 which accommodates a brake piston 5 in an axially displaceable fashion. Brake fluid can be supplied into the service pressure chamber 6 produced between brake cylinder 9 and brake piston 5 for the purpose of performing service brake operations so that brake pressure develops which displaces the brake piston 5 axially alongside a longitudinal piston axis A towards the brake disc. As a result, the brake pad 34 facing the brake piston 5 is pressed against the brake disc, wherein the brake housing 29 as a reaction displaces in the opposite direction, thereby urging also the other brake pad 33 against the brake disc.

An actuating device 4 which is necessary to perform a parking brake operation is substantially presented by a rolling-element ramp-type gear 1, 2, 3. The rolling-element ramp-type gear 1, 2, 3 is operable by an electromechanical actuator 7 and formed of a driving ramp 1 and an output end ramp 2. As can be seen in FIG. 2, the rolling-element ramp-type gear 1, 2, 3 is responsible for the generation of the clamping force for performing a parking brake operation. The use of the rolling-element ramp-type gear 1, 2, 3 is advisable due to its high rate of efficiency. As has been mentioned before, the rolling-element ramp-type gear 1, 2, 3 consists of a driving ramp 1 and an output end ramp 2. Rolling elements 3 provided as steel balls are arranged between the halves of the ramp, and the driving ramp 1 is in contact with the output end ramp 2 by way of the rolling elements. A compression spring 10 applies an axial force to the output end ramp 2. The output end ramp 2 is secured against rotation in a cartridge 19 and can only perform a stroke movement along the longitudinal piston axis A. The cartridge 19 is connected to a ramp supporting ring 20 which, in turn, is press fitted in the brake housing 29 and thereby is formed fast with the housing in radial and axial directions. The driving ramp 1 can perform a rotation and is pressed with the axial force of the compression spring 10 onto an axial bearing 18 which is supported on the ramp supporting ring 20. In detail, the rolling-element ramp-type gear 1, 2, 3 causes the rolling elements 3 to roll in the ramp tracks by twisting the two ramp halves 1, 2 relative to each other. This implies a very high speed reduction, on the one hand, and, on the other hand, a conversion of the rotary input quantity into a translational output quantity in the form of a 'rot-trans gear'. A gear lift in the direction of the longitudinal piston axis A is produced as a translational output quantity. This gear lift is transmitted to the brake piston 5 during the electromechanical clamping movement of the brake caliper by means of the electromechanical actuator using a mechanical adjusting device 30 that acts as an actuating element. In this arrangement, the gear lift essentially corresponds to the stroke of the brake piston during clamping movement.

The adjusting device 30 considers the lining wear at the brake pads 33, 34 and compensates it by an extension in the direction of the longitudinal piston axis A. As a result, the necessary clamping stroke of the brake piston 5 and, thus, the gear lift of the rolling-element ramp-type gear 1, 2, 3 can be maintained constant. The adjusting device 30 is unrotatably connected to the rolling-element ramp-type gear 1, 2, 3, on the one hand, and is connected to the brake piston 5, on the other hand. It can be extended in the direction of the longitudinal piston axis A and basically comprises a nut-and-spindle assembly with a spindle 35 which abuts on the output end ramp 2 in an unrotatable fashion and a nut 36 which is arranged rotatably on the spindle 35 and is supported on the brake piston 5. Nut 36 and spindle 35 are secured in place relative to each other by means of several springs so that extension of the adjusting device 30 in the direction of the longitudinal piston axis A is brought about in the event of brake lining wear. The principal construction of such an adjusting device 30 as well as its function are e.g. known from DE 195 21 634 A1 and shall not be explained in detail herein.

To impart rotation to the driving ramp 1, a shank 17 is provided which is connected to the driving ramp 1 and is radially supported in a radial sliding bearing. Shank 17 projects from the brake housing 29 and is driven by the electromechanical actuator 7 by the intermediary of a two-step gear. As this occurs, means are provided for sealing the service pressure chamber 6 in the bore of the brake housing 29 through which the shank 17 is projecting. The electromechanical actuator 7 and the two-step gear are accommodated in a housing 28 which can be closed by a housing cover. In the first embodiment illustrated in FIG. 2, the two-step gear is designed as a two-step worm gear 11, 12. Worm gears represent a category of screw-type rolling contact gears in which there is also a sliding component in the motion, what is in contrast to the roll motion transmission gears. The construction of such a worm gear consists of a helically toothed wheel, the worm, and a meshing helically toothed wheel, the worm wheel.

The first gear step, that means the first worm gear 11, is connected on the inlet side to the output shaft 8 of the electromechanical actuator 7, while the second gear step that means the second worm gear 12 on the outlet side is connected to the shank 17 or to the rolling-element ramp-type gear 1, 2, 3. As is illustrated in FIG. 2, a first worm 13 is mounted onto the output shaft 8 of the electromechanical actuator 7 and meshes with a first worm wheel 14. As will be explained in more detail hereinabove by way of FIG. 5a, a second worm 15 is plugged onto the turning center of the first worm wheel 14 which imparts rotation to it. This second worm 15 in turn meshes with a second worm wheel 16 which is unrotatably connected to the shank 17 and imparts rotation to the shank 17 together with the driving ramp 1, thereby producing a lifting movement of the output end ramp 2, as has been described before. The second worm gear 12 has a self-locking design in order to maintain the clamping force which is adjusted this way during a parking brake operation.

Figure 3:
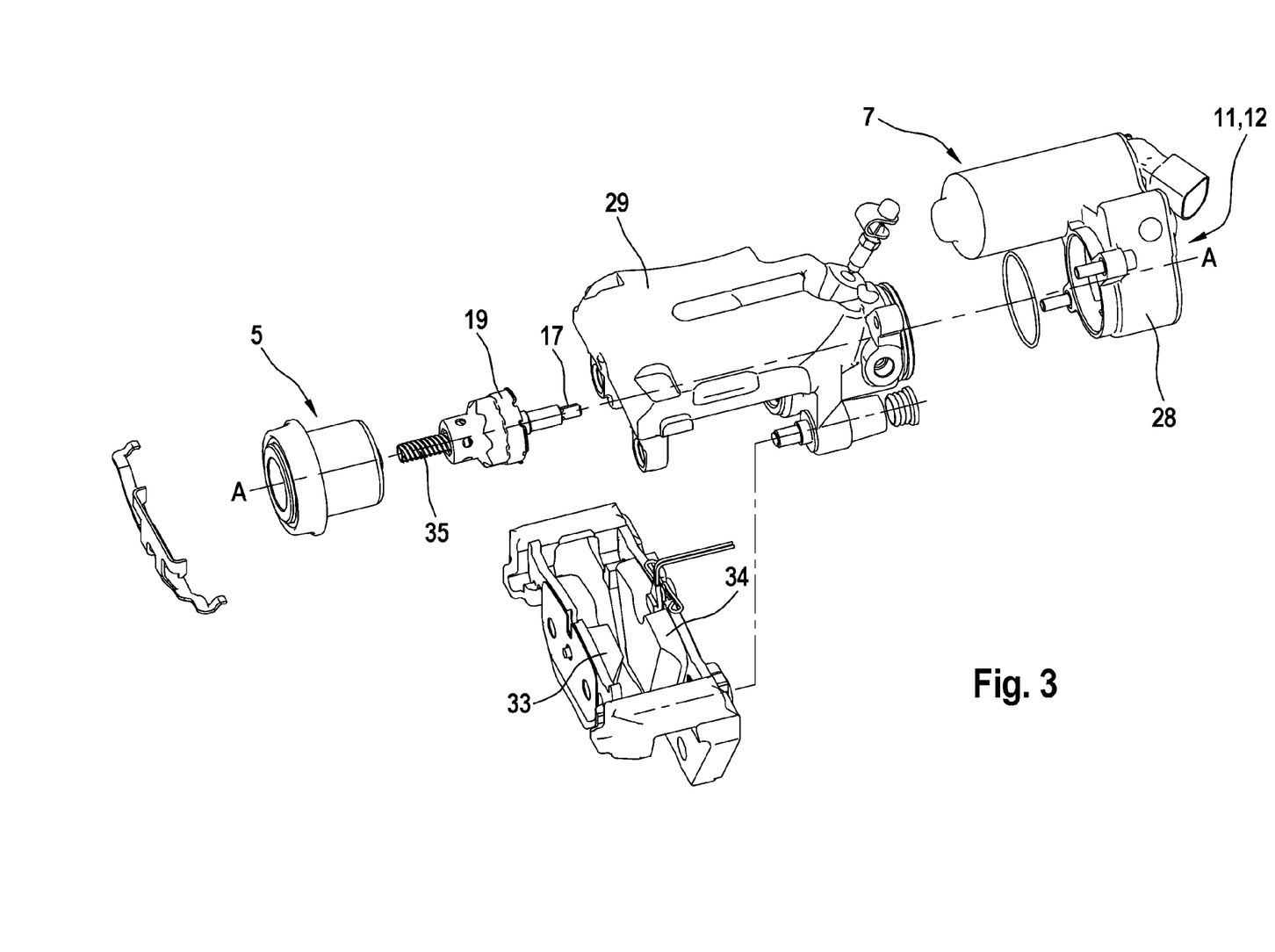
FIG. 3 is an exploded view of the vehicle brake of FIG. 1.

FIG. 3 illustrates a so-called exploded view of the vehicle brake shown in FIGS. 1 and 2. At the right-hand end of the dotted longitudinal piston axis A is the housing 28 which accommodates the electromechanical actuator 7 and the two-step gear, i.e. the first and the second worm gears 11, 12. Together they form an electromechanical actuating unit which represents an independently manageable subassembly and can be pre-tested. This electromechanical actuating unit is slipped into the brake housing 29. On the left-hand side of the brake housing 29 in FIG. 3, the cartridge 19 is depicted which has been mentioned already by way of FIG. 2 and accommodates the rolling-element ramp-type gear 1, 2, 3. As has been mentioned already with reference to FIG. 2, the rolling-element ramp-type gear 1, 2, 3 is connected to the spindle 35, on the one hand, and to the shank 17, on the other hand. Following the longitudinal piston axis A, the vehicle brake is supplemented by the brake piston 5 and by the two brake pads 33, 34 placed in a mounted support. The arrangement of the electromechanical actuating unit in parallel to the longitudinal piston axis A allows an especially compact type of construction for the brake caliper, on the one hand, while the modular type of construction illustrated in FIG. 3 is rendered possible, on the other hand.

Figure 4:
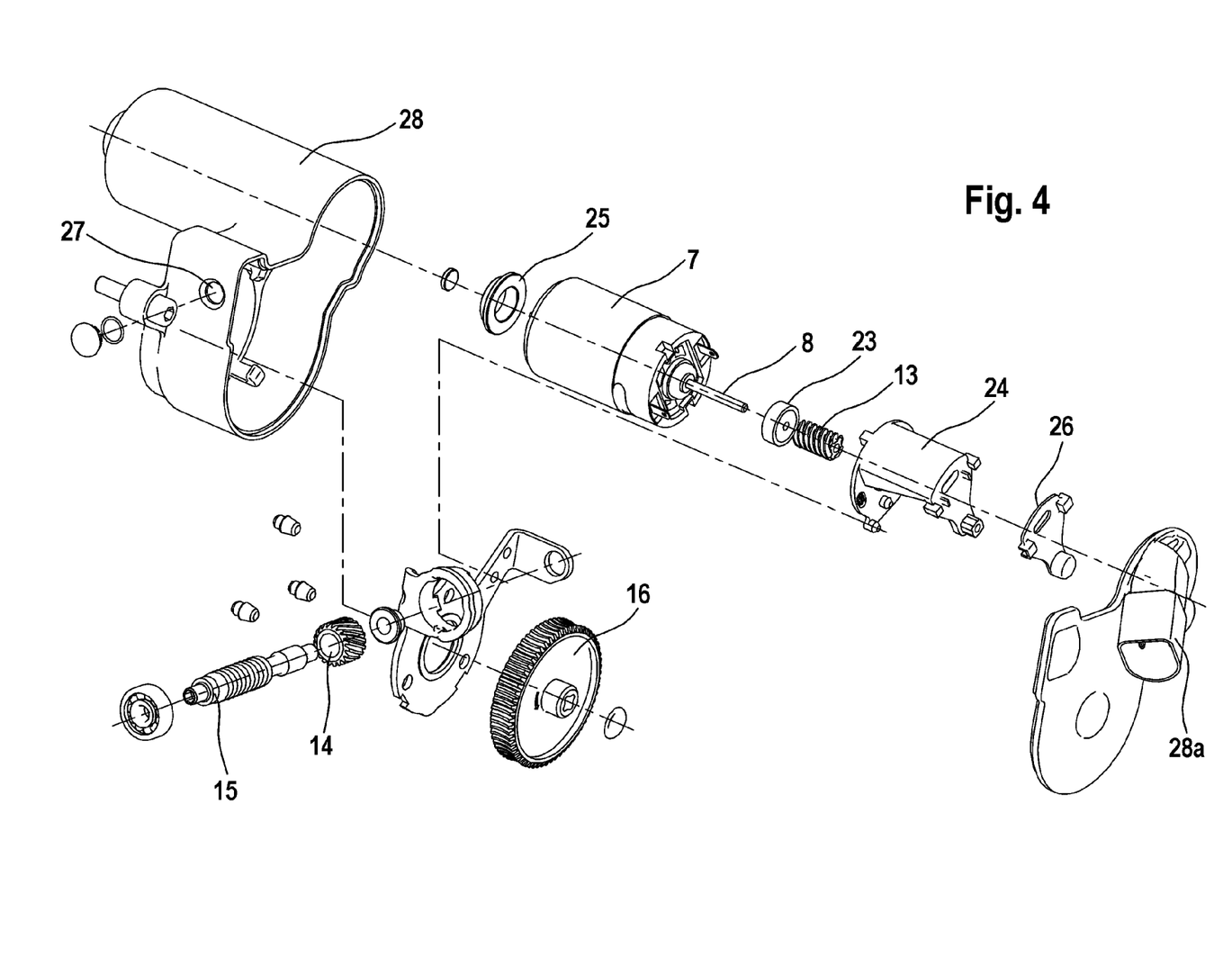
FIG. 4 is an exploded view of a first design of a two-step gear.

FIG. 4 shows the first design of the two-step gear between the electromechanical actuator 7 and the rolling-element ramp-type gear 1, 2, 3 as first and second worm gears 11, 12. The housing 28 accommodates the electromechanical actuator 7 as mentioned above. It is provided that the electromechanical actuator 7 is decoupled with respect to the housing 28 in order that the noises developing and the vibrations of the electromechanically actuator 7 cannot be transmitted onto the adjacent components and the annoyance of the surroundings caused by the noise is reduced to a minimum. A first dampening element 25 designed as a rubber bearing is interposed between the electromechanical actuator 7 and the housing 28 for this purpose. A second dampening element 26 which is designed as a dampening rubber is arranged for the same purpose in terms of effect between the electromechanical actuator 7 and the housing cover 28a. As has been referred to already in FIG. 2, the first worm 13 is slipped onto the output shaft 8 of the electromechanical actuator 7. Further, an encoder 23 is plugged onto the output shaft and cooperates with a sensor element 24 on the housing, thus detecting the angular position of the output shaft 8. The travel of the brake piston 5 can be detected this way and serves as a regulating variable for the regulation of the clamping force in addition to the measured value of the current consumption of the electromechanical actuator 7. An appropriate detection means is also provided to detect the current consumption of the electromechanical actuator 7.

The first worm 13 meshes with the first worm wheel 14 as can also be taken from the exploded view in FIG. 4. The second worm 15 is slipped into a central bore of the first worm wheel 14 so that rotation of the first worm wheel 14 induces a rotation of the second worm 15. The second worm 15 meshes with the second worm wheel 16 as mentioned before.

It becomes also apparent from FIG. 4 that housing 28 includes a housing opening 27 which allows access for a mechanical unlocking intervention in order to provide emergency unlocking of the parking brake upon failure or a defect of the electric energy supply.

As an alternative, the just mentioned sensor element 24, instead of the angular position of the output shaft 8 of the electromechanical actuator 7, can also sense the angular position of the two worms 13, 15 or the two worm wheels 14, 16, whereby likewise the travel of the brake piston 5 and, thus, the set clamping force can be determined.

Figure 5A:
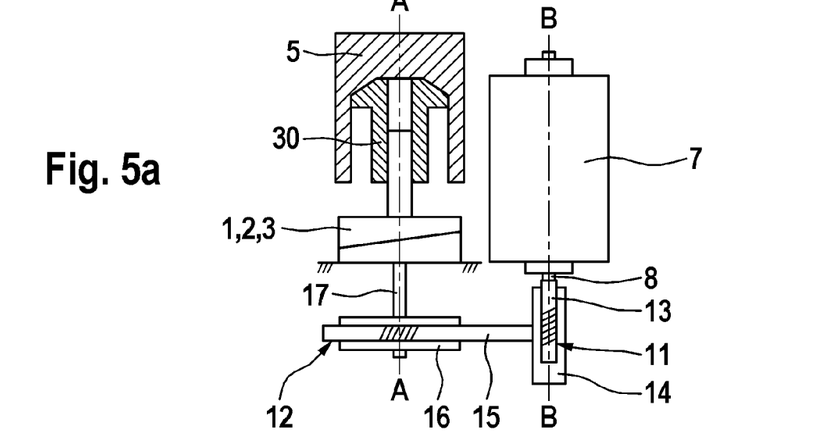
FIG. 5a,b,c are schematic representations of three embodiments of a two-step gear.

FIGS. 5a, b, c depict three embodiments of the two-step gear between the electromechanical actuator 7 and the rolling-element ramp-type gear 1, 2, 3. The first embodiment illustrated in FIG. 5a has been described already with respect to FIGS. 2 and 4. Two worm gears 11, 12 are concerned in this case. As mentioned before, the output shaft 8 of the electromechanical actuator 7 imparts rotation to the first worm 13. The first worm 13 meshes with the first worm wheel 14 which, in turn, imparts rotation to the second worm 15 because the second worm 15 is connected to the turning center of the first worm wheel 14. The second worm 15 in turn meshes with a second worm wheel 16 and applies a torque to the shank 17 and thus the rolling-element ramp-type gear 1, 2, 3. As a result, the rolling-element ramp-type gear 1, 2, 3 performs a translational lift which acts on the brake piston 5 by way of the mechanical adjusting device 30, thus producing a clamping force. In order to maintain the adjusted clamping force during a parking brake operation, the second worm gear 12 has a self-locking design. Further, it can be taken once more from FIG. 5a that the electromechanical actuator 7 is arranged in such a way that its axis of symmetry B is in parallel to the longitudinal piston axis A.

Figure 5B:
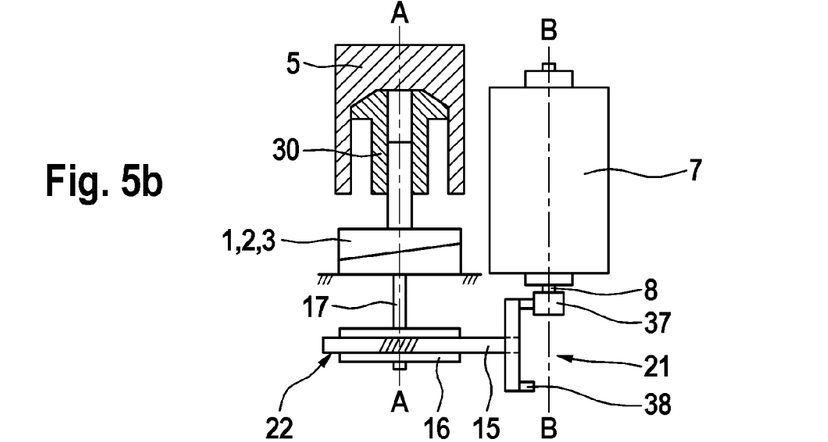

FIG. 5b illustrates a second embodiment of the two-step gear. The two-step gear is configured as a combination of a crown gear 21 and a worm gear 22. A toothed wheel 37 is fitted to the output shaft 8 of the electromechanical actuator 7 and cooperates with a crown wheel 38. Mounted in the turning center of the crown wheel 38 is a worm 15 which meshes with a worm wheel 16 connected to the shank 17. Upon actuation of the electromechanical actuator 7, the rotation of the output shaft 8 is directed via the crown gear 21 to the worm gear 22 and, thus, to the shank 17, what induces a rotary lift movement of the rolling-element ramp-type gear 1, 2, 3 as described hereinabove. The worm gear 22 has a self-locking design in order to maintain the so produced clamping force of the brake piston 5 which is adjusted this way during a parking brake operation.

Figure 5C:
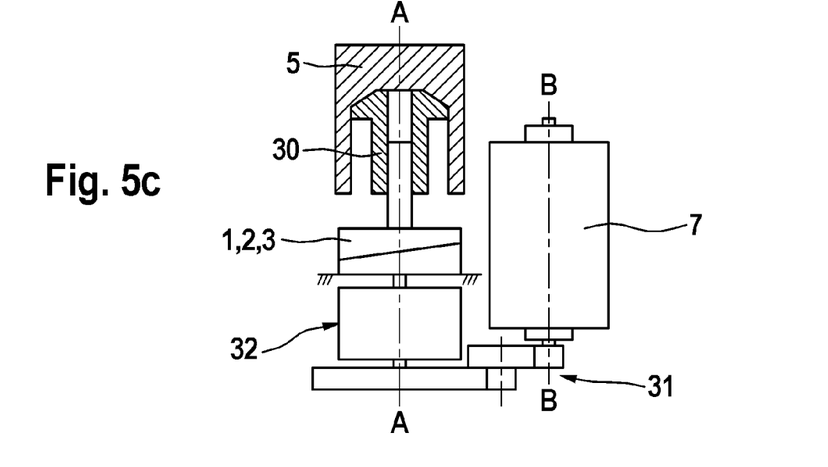

In the third embodiment illustrated in FIG. 5c, the two-step gear is designed between the electromechanical actuator 7 and the rolling-element ramp-type gear 1, 2, 3 as a combination of a gear reducer unit 31 and an eccentric gear 32. A reduction gear is an additional gear and reduces the rotational speed of the driven shaft. The available torque is thereby increased. The gear reducer unit 31 and the eccentric gear 32 act like the already described embodiments of the two-step gear.

Figure 6A:
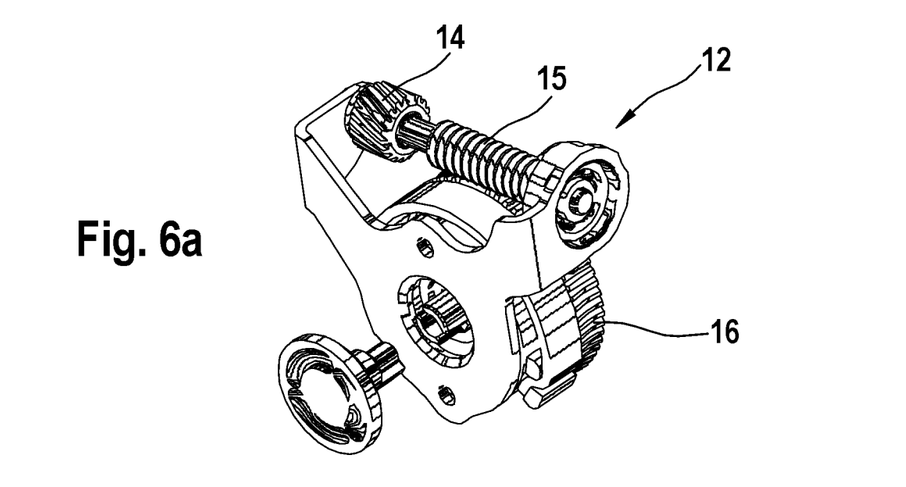
FIG. 6a,b is a schematic representation of a spring element arranged in the flux of moments.
Figure 6B:
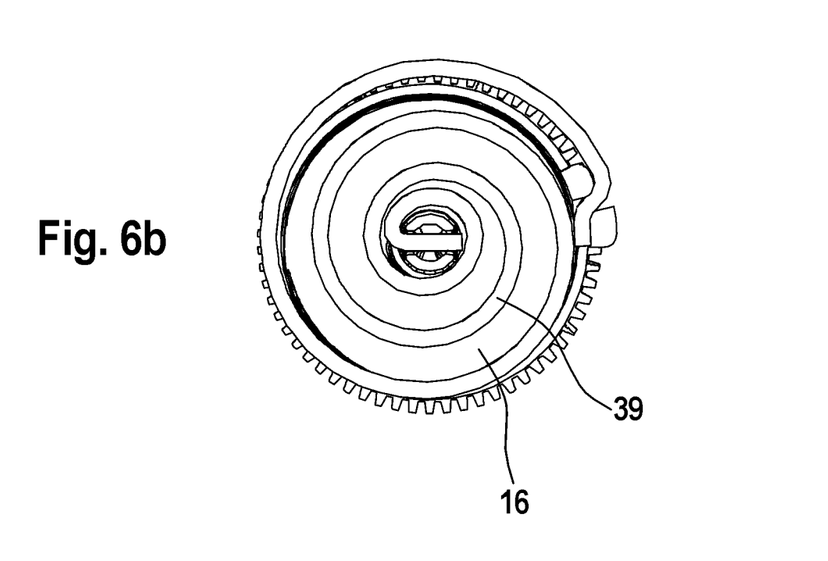

The second worm gear 12 of the design described by way of FIG. 5a is depicted once more in FIG. 6a. It can be seen once again that the second worm 15 is fitted into the turning center of the first worm wheel 14. As becomes apparent from FIG. 6b, a spring element configured as a torsion spring 39 is provided to maintain the adjusted clamping force. The torsion spring 39 is arranged in the flux of moments and acts on the second worm wheel 16. It can be tensioned or loaded upon rotation of the worm wheel 16 and compensates thermal shrinking effects.

Figure 7:
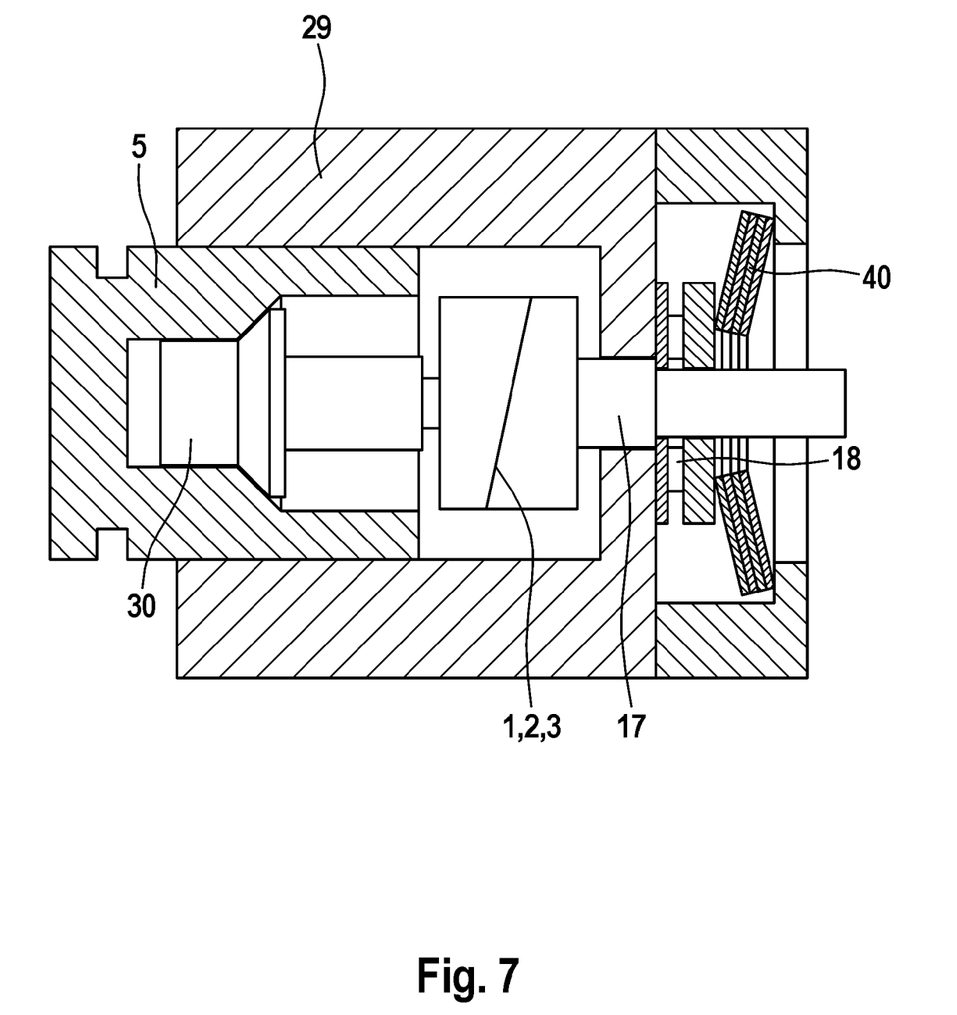
FIG. 7 is a schematic representation of a spring element arranged in the flux of forces.

Alternatively, a spring element designed as an assembly of cup springs 40 is arranged in the flux of forces in order to maintain the adjusted clamping force and to compensate thermal shrinking effects, as is illustrated in FIG. 7. The cup spring assembly 40 is fitted below the axial bearing 12 described with reference to FIG. 2 and can be loaded hydraulically and/or mechanically. The cup spring assembly 40 acts on the brake piston 5 by way of the axial bearing 18, the rolling-element ramp-type gear 1, 2, 3, and the mechanical adjusting device.

It is achieved owing to the mentioned spring elements that the clamping force that acts on the brake pads 33, 34 is almost independent of thermally induced changes in length in the area of the brake caliper.

The advantages of the invention at issue can be seen in the high rate of efficiency of the gear arrangement and the reduced electric power consumption entailed thereby. The use of noise-optimized gears mounted in rubber dampers achieves reduced running noise, and the integration of a spring element makes additional clamping of the thermally loaded brake during the cooling process unnecessary.

LIST OF REFERENCE NUMERALS

1 driving ramp
2 output end ramp
3 rolling element
4 actuating device
5 brake piston
6 hydraulic service pressure chamber
7 electromechanical actuator
8 output shaft
9 brake cylinder
10 compression spring
11 first worm gear
12 second worm gear
13 first worm
14 first worm wheel
15 second worm
16 second worm wheel
17 shank
18 axial bearing
19 cartridge
20 ramp supporting ring
21 crown wheel gear
22 worm gear
23 encoder
24 sensor element
25 dampening element
26 dampening element
27 access for mechanical unlocking intervention
28 housing
28a housing cover
29 brake housing
30 mechanical adjusting device
31 gear reducer unit
32 eccentric gear
33 brake pad
34 brake pad
35 spindle
36 threaded nut
37 toothed wheel
38 crown wheel
39 spring element/torsion spring
40 spring element/cup spring

The invention claimed is:

1. A hydraulic vehicle brake with a parking brake device for motor vehicles comprising a brake housing in which a hydraulic service pressure chamber is delimited by a brake piston, wherein hydraulic pressure fluid can be applied to the hydraulic service pressure chamber for carrying out service brake operations so that the brake piston is actuatable along a longitudinal piston axis (A) in order to achieve a braking effect, wherein the parking brake device acts on the brake piston by means of an actuating device, which actuates the brake piston to perform parking brake operations by means of a rolling-element ramp gear that is driven by an electromechanical actuator, and holds the brake piston in the actuated position, wherein at least one spring element acts on the rolling-element ramp gear in order to bias the brake piston toward the actuated position, maintain an adjusted clamping force on the hydraulic vehicle brake, and compensate thermal shrinking effects of the hydraulic vehicle brake, wherein a two-step gear is interposed between the electromechanical actuator and the actuating device, the first gear step on the inlet side being connected to an output shaft of the electromechanical actuator and the second gear step on the outlet side being connected to the rolling-element ramp gear, and wherein the two-step gear is a combination of a crown gear and a worm gear, with the worm gear forming the second gear step and having a self-locking design.

2. A hydraulic vehicle brake with a parking brake device for motor vehicles comprising a brake housing in which a hydraulic service pressure chamber is delimited by a brake piston, wherein hydraulic pressure fluid can be applied to the hydraulic service pressure chamber for carrying out service brake operations so that the brake piston is actuatable along a longitudinal piston axis (A) in order to achieve a braking effect, wherein the parking brake device acts on the brake piston by means of an actuating device, which actuates the brake piston to perform parking brake operations by means of a rolling-element ramp gear that is driven by an electromechanical actuator, and holds the brake piston in the actuated position, wherein at least one spring element acts on the rolling-element ramp gear in order to bias the brake piston toward the actuated position, maintain an adjusted clamping force on the hydraulic vehicle brake, and compensate thermal shrinking effects of the hydraulic vehicle brake, wherein a two-step gear is interposed between the electromechanical actuator and the actuating device, the first gear step on the inlet side being connected to an output shaft of the electromechanical actuator and the second gear step on the outlet side being connected to the rolling-element ramp gear, and wherein the two-step gear is designed as a combination of a gear reducer unit and an eccentric gear, wherein the eccentric gear forms the second gear step and has a self-locking design.

3. A hydraulic vehicle brake with a parking brake device including a brake housing in which a hydraulic service pressure chamber is delimited by a brake piston, wherein hydraulic pressure fluid can be applied to the hydraulic service pressure chamber for carrying out service brake operations so that the brake piston is actuatable along a longitudinal piston axis (A) in order to achieve a braking effect, wherein the parking brake device acts on the brake piston by means of an actuating device, which actuates the brake piston to perform parking brake operations by means of a rolling-element ramp gear that is driven by an electromechanical actuator, and holds the brake piston in the actuated position, wherein at least one spring element acts on the rolling-element ramp gear in order to bias the brake piston toward the actuated position, maintain an adjusted clamping force on the hydraulic vehicle brake, and compensate thermal shrinking effects of the hydraulic vehicle brake, wherein a two-step gear is interposed between the electromechanical actuator and the actuating device, the first gear step on the inlet side being connected to an output shaft of the electromechanical actuator and the second gear step on the outlet side being connected to the rolling-element ramp gear, and wherein the two-step gear is configured as a two-step worm gear, and at least one of the two gear steps has a self-locking design.

4. The hydraulic vehicle brake as claimed in claim 3, wherein the electromechanical actuator is arranged in such a fashion that its output shaft is disposed in parallel to the longitudinal piston axis (A).

5. The hydraulic vehicle brake as claimed in claim 4, wherein dampening elements decouple the electromechanical actuator from the brake housing and a housing which accommodates the two-step gear and the electromechanical actuator.

6. The hydraulic vehicle brake as claimed in claim 3, wherein a sensor element is provided to sense the angular position of the output shaft of the electromechanical actuator or to sense the angular position of a gear element.

7. The hydraulic vehicle brake as claimed in claim 3, wherein the consumption of the electromechanical actuator is measured.

8. The hydraulic vehicle brake as claimed in claim 3, wherein the spring element is designed as a cup spring assembly, which acts on the brake piston and can be loaded hydraulically and/or electromechanically.

9. The hydraulic vehicle brake as claimed in claim 3, wherein the spring element is configured as a torsion spring, which acts on a gear element of the two-step worm gear and can be loaded electromechanically.

10. The hydraulic vehicle brake as claimed in claim 3, wherein the vehicle brake has a modular design, and wherein the electromechanical actuator and the two-step gear are part of a subassembly that can be handled independently.

11. The hydraulic vehicle brake as claimed in claim 3, wherein the brake has a mechanical unlocking device for unlocking the parking brake.

12. The hydraulic vehicle brake as claimed in claim 3, wherein the rolling-element ramp gear is formed of a driving ramp and an output end ramp, wherein rolling elements are provided between the driving ramp and the output end ramp.

* * * * *